United States Patent Office 2,697,108
Patented Dec. 14, 1954

2,697,108

16-THIOBENZYL PREGNENES AND PROCESS

George Rosenkranz, Carl Djerassi, and Jesús Romo, Mexico City, Mexico, assignors to Syntex S. A., Mexico City, Mexico, a corporation of Mexico No Drawing. Application January 18, 1951, Serial No. 206,726

13 Claims. (Cl. 260—397.3)

The present invention relates to novel cyclopentanoperhydrophenanthrene derivatives and a process for preparing the same.

More particularly the present invention relates to the reaction of $\alpha,\beta$-unsaturated steroid ketones with mercaptans, in particular benzyl mercaptan, and to novel derivatives produced thereby. The derivatives of the present invention are especially suitable as intermediates for the production of therapeutics.

Although it has been previously proposed to react certain $\alpha,\beta$ unsaturated steroid ketones with mercaptans in the presence of suitable catalysts therefor, as for example in United States Patent No. 2,451,434 to Dorfman and Bernstein, it has generally been supposed that in the presence of catalysts, such as acid catalysts, as for example zinc chloride, mercaptans react with saturated as well as $\Delta^4$-3-keto steroids to produce mercaptoles rather than the desired mercaptan. The mercaptole production has been favored in particular where an excess of the mercaptan has been utilized. Although in the aforementioned patent to Dorfman and Bernstein it has been indicated that two mols of mercaptan should be used, and in particular ethyl mercaptan, it is believed that in this particular instance the reaction is exceptional since others have obtained mercaptoles in a similar reaction. Thus Hauptmann, 69 JACS 562 (1947) obtained a mercaptole of $\Delta^4$-cholestenone, using benzyl mercaptan in excess.

In accordance with the present invention, however, it has been discovered that corresponding 3-benzyl thioenol ethers may be obtained from $\Delta^4$-3-keto steroids in excellent yields utilizing an excess of the benzyl mercaptan and in the presence as a catalyst of pyridine hydrochloride.

It has further been discovered, in accordance with the present invention that the 3-benzyl thioenol ethers may be obtained even in the presence on the nucleus of sensitive carbonyl containing groupings, such as the ketol side chain and the 17$\alpha$-hydroxy-20-ketone moiety characteristic of the adrenal cortico steroids and the spiro ketal system of sapogenins.

It has further been discovered, in accordance with the present invention, that the mercaptans, especially benzyl mercaptan, may be reacted with steroids containing both the $\Delta^4$-3-ketone grouping and the $\Delta^{16}$-20-ketone, as for example, 16-dehydroprogesterone, and that by suitable selection of the catalyst there may be produced either the 3-thioenol ether and/or addition to the 16 double bond.

Further, certain of the 3-enol ethers thus produced may be treated with lithium aluminum hydride in accordance with the present invention with the production of novel compounds.

In accordance with the present invention a $\Delta^4$-3-keto steroid may be reacted with an excess of benzyl mercaptan in the presence of pyridine hydrochloride in order to produce the corresponding 3-enol-thioether and the reaction may be exemplified by the following equation:

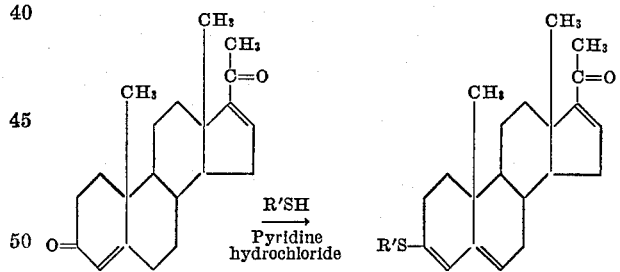

Preferably, in the above reaction, an excess of mercaptan, preferably benzyl mercaptan, is used, i. e. 2 mols or more and the pyridine hydrochloride is present in catalytic amounts. The steroid is preferably dissolved in a suitable solvent and the reaction carried out under anhydrous conditions. In the above equation, R may be, for example, $COCH_3$, $COCH_2OAc$,

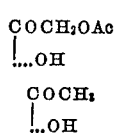

22-sapogenin side chain at C–17 and C–16, O, OH, and $C_8H_{17}$. The ring nucleus may also be substituted or further unsaturated in various positions known in steroids. $R^1$ is preferably the benzyl radical although other mercaptans may be utilized.

In the above reaction the steroid, which may be of the character above described, is dissolved in a suitable solvent, as for example in the case of $\Delta^4$-androstene-3,17-dione, benzene and is preferably dried by distilling a small proportion thereof. Thereafter the pyridine hydrochloride is added together with an absolute alcoholic solvent, such as absolute ethanol, and the mercaptan preferably in excess, i. e. 2 mols or more. The reaction mixture is then refluxed for a substantial period of time, as for example three hours. The mixture is then diluted, as with ether, washed with carbonate solution, dried and evaporated. The residue may then be crystallized from a suitable solvent, such as methanol, to produce the enol ether.

By using pyridine hydrochloride a substantial yield of the 3-thio ether is obtained, even where there is present in addition to the $\Delta^4$-3-keto grouping the $\Delta^{16}$-20-ketone grouping and this reaction may be indicated by the following equation:

In the above equation $R^1$ represents the same radicals as previously referred to, and in practicing the above process the same reaction conditions are employed, i. e. solution in a suitable solvent, etc.

By utilizing a basic catalyst, however, such as piperidine, addition takes place to the 16,17 double bond as may be indicated by the following equation:

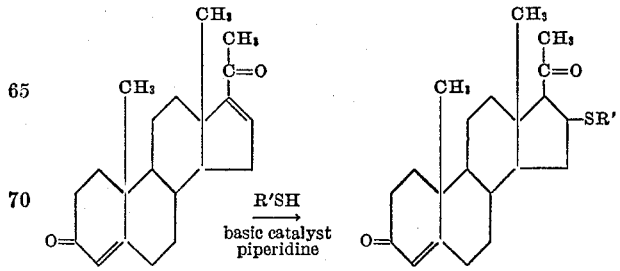

In the above equation $R^1$ again represents the same radicals as hereinbefore set forth and the steroid is also dissolved in a solvent and refluxed as previously set forth, except that piperidine is utilized as the catalyst.

On the other hand, if a more strongly acid catalyst is utilized, as for example, p-toluenesulfonic acid, both the thioenol ether grouping at the 3-position is produced as well as addition to the 16,17 double bond as exemplified by the following equation:

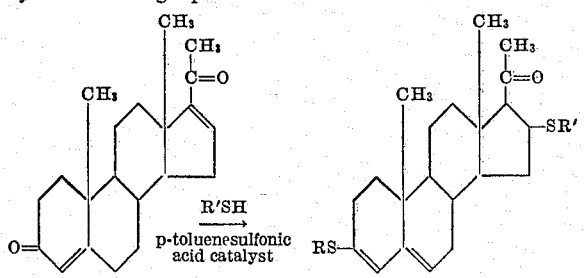

In the above equation $R^1$ represents the same radicals as previously referred to and in practicing the above process the same reaction conditions are employed, i. e. solution in a suitable solvent, etc. As above set forth, the catalyst utilized is p-toluenesulfonic acid, or other strong acid.

The compound thus produced may then be subjected to acid hydrolysis to remove the thioenol ether in accordance with the following equation:

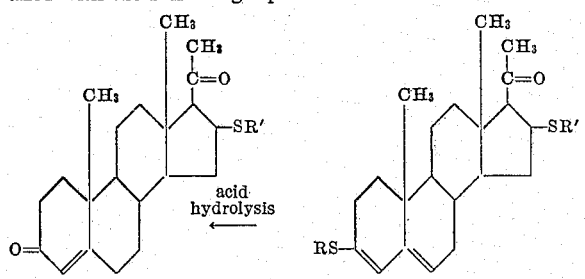

The above reactions may be utilized desirably for the production of thioenol ethers of progesterone and 17α-hydroxy progesterone which may be further reduced to the corresponding 20β-hydroxy derivatives in accordance with the following equation:

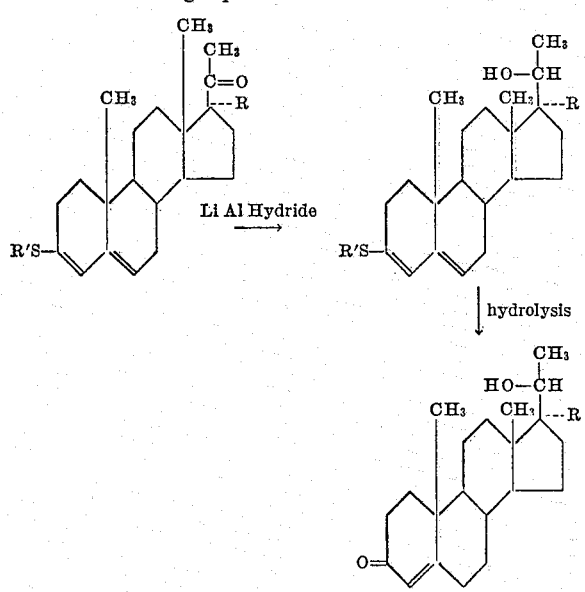

In the above equation R may be hydrogen in the case of progesterone and —OH in the case of 17α-hydroxy progesterone.

In practicing the process above set forth, the thioenol ether is dissolved in a suitable solvent, such as ether, and is then added to lithium aluminum hydride also dissolved in ether, the addition taking place slowly. The reaction mixture is then refluxed for a short period of time, such as fifteen minutes, and decomposed with water. Thereafter the product is extracted with ether, washed and evaporated. The product may then be recrystallized from a suitable solvent, such as methanol-acetone.

In general it may be stated that while thioenol ether formation of the character above described proceeds only in the presence of acid catalysts, the addition to sterically unhindered α,β-unsaturated carbonyl systems, i. e. the $\Delta^{16}$-20-keto grouping, can be catalyzed with either acid or base. Thus $\Delta^5$-16-thiobenzylpregnese-3β-ol-one 3-acetate may be produced from 5,16-pregnadiene-3β-ol-20-one 3-acetate by reaction with benzyl mercaptan in the presence of pyridine hydrochloride or piperidine. This reaction is exemplified by the following formula:

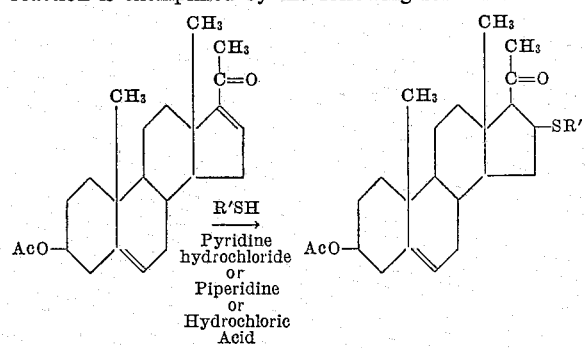

In the above equation $R^1$ represents the radicals previously set forth. In practicing the process the $\Delta^5$-16-pregnadiene-3β-ol-20-one 3-acetate is dissolved in a suitable solvent, such as benzene and then allowed to stand at room temperature for a period of time, as for example four days, with benzyl mercaptan in substantial molar excess together with the piperidine. The resultant product is then washed with dilute acid, such as hydrochloric acid, carbonate solution and water. It is thereafter evaporated and recrystallized from hexane. When pyridine hydrochloride is utilized as the catalyst, the reaction mixture is refluxed instead of being allowed to stand.

As previously pointed out, acid hydrolysis of the 3-thioenol ether steroids reconstitutes the $\Delta^4$-3-keto grouping. In addition the 3-thioenol ether grouping may be desulfurized to the corresponding $\Delta^{3,5}$ compound, or, in the case of the corresponding $\Delta^{16}$ compound, to the corresponding $\Delta^{3,5,16}$ compound. Thus, as previously pointed out, the addition of benzyl mercaptan to the $\Delta^{16}$-20-keto-steroids, as for example, 16-dehydroprogesterone produces 16-thiobenzyl progesterone which could also be obtained by acid hydrolysis of 16-thiobenzyl-progesterone 3-benzylthioenol ether, this latter compound being produced by the p-toluenesulfonic acid catalyzed condensation of benzyl mercaptan with 16-dehydroprogesterone previously set forth. Desulfurization of the 16-thiobenzyl 3-benzylthioenol ether of progesterone, however, produced the $\Delta^{3,5}$-pregnadiene-20-one which could also be synthesized by hydrogenolysis of progesterone 3-benzylthioenol ether. Further, acid hydrolysis of $\Delta^{4,16}$-pregnadiene-3,20-dione 3-benzylthioenol ether also produced 16-thiobenzylprogesterone due to initial cleavage to 16-dehydroprogesterone followed by addition of the liberated benzylmercaptan to the double bond in the presence of the acid catalyst hydrochloric acid.

The following specific examples serve to illustrate but are not intended to limit the present invention:

*Example I*

$\Delta^4$-*androstene-3,17-dione 3-benzylthioenol ether.*—A solution of 3.0 g. of $\Delta^4$-androstene-3,17-dione in 150 cc. of benzene was dried by distilling 25 cc.; 0.1 g. of pyridine hydrochloride, 10 cc. of absolute ethanol and 3 g. of benzyl mercaptan were added and the mixture was refluxed for three hours. After dilution with ether, washing with carbonate solution, drying and evaporating, the residue was crystallized from methanol yielding 3.3 g. (81%) of colorless needles of the enol ether with melting point 175–178° C., ultraviolet maximum at 268 mu (log E 4.39).

*Example II*

*Testosterone 3-benzylthioenol ether.*—The reaction was carried out as in Example I with 1.9 g. of testosterone, 1.5 g. of benzyl mercaptan, 0.1 g. of pyridine hydrochloride, 10 cc. of ethanol and 150 cc. of benzene: yield, 1.5 g. (57%), melting point 165–167.5° C., $(\alpha)_D^{20}$ —117° (dioxane), ultraviolet maximum at 268 mu (log E 4.38).

*Example III*

$\Delta^4$*cholesten-3-one 3-benzylthioenol ether.*—A 79% yield of thioenol ether with melting point 120–121° C., ultra-violet maximum at 268 mu (log E 4.20) was realized when 3.0 g. of $\Delta^4$-cholesten-3-one was condensed with 6.0 g. of benzyl mercaptan by the pyridine hydrochloride method of Example I. The same ratio of reactants in the presence of zinc chloride as a catalyst gives a nearly quantitative yield of mercaptol.

Example IV $\Delta^4$-22-isospirosten-3-one ($\Delta^4$-diosgen-3-one) 3-benzylthioenol ether.—Condensation of 8 g. of $\Delta^4$-22-isospirosten-3-one with 8 g. of benzyl mercaptan in 150 cc. of benzene in the presence of 1.5 g. of pyridine hydrochloride and 25 cc. of ethanol according to the method of Example I, gave 6.7 g. (67%) of enol ether as minute needles with melting point 158–160° C. Several recrystallizations from acetone raised the melting point to 165–167° C., $(\alpha)_D^{20}$ —146.9° (dioxane), ultra-violet maximum at 268 mu (log E 4.31).

Analysis.—Calculated for $C_{34}H_{48}O_2S$: C, 78.72; H, 8.93; S, 6.16. Found: C, 78.62; H, 8.85; S, 6.40.

Acid hydrolysis (one hour refluxing) regenerated $\Delta^4$-22-isospirosten-3-one.

Example V $\Delta^{3,5}$-22-isospirostadiene.—The desulfurization of the above enol ether of Example IV (5.0 g.) was carried out by refluxing with 800 cc. of acetone and 70 g. of W-2 Raney nickel catalyst for one hour and then allowing the solution to stand at room temperature for twenty-four hours. Filtration, evaporation to dryness and recrystallization from acetone-methanol afforded 3.0 g. (78%) of the diene with melting point 167–168° C., $(\alpha)_D^{20}$ —150°, ultra-violet maxima at 228 mu (log E 4.27) and 234 mu (log E 4.30).

Analysis.—Calculated for $C_{27}H_{40}O_2$: C, 81.76; H, 10.16. Found: C, 81.60; H, 10.31.

Example VI 22-isoallospirostan (desoxytigogenin).—Hydrogenation of 1.0 g. of the diene of Example V in 100 cc. of ethyl acetate solution with 0.1 g. of 10% palladium-on-charcoal catalyst resulted in the takeup of 2 mols of hydrogen in one and one-half hours. Crystallization from methanol-ethyl acetate gave 0.82 g. of 22-isoallospirostan with melting point 171–174° C., tetranitromethane test negative. The analytical sample had melting point 176–177.5° C., $(\alpha)_D^{20}$ —73.9°.

Analysis.—Calculated for $C_{27}H_{44}O_2$: C, 80.94; H, 11.07. Found: C, 81.08; H, 11.29.

Example VII

Progesterone 3-benzylthioenol ether.—The condensation of progesterone (8.0 g.) with benzyl mercaptan (5.0 g.) in the presence of pyridine hydrochloride (1.0 g.) was performed exactly as in Example I (five hours refluxing) and produced 7.1 g. (65%) of enol ether with melting point 142–144° C. When 0.2 g. of p-toluenesulfonic acid was substituted for the pyridine hydrochloride (ethanol was also omitted) the yield of enol ether dropped to 34%. Recrystallization from acetone afforded the analytical sample with melting point 146.5–148.5° C., $(\alpha)_D^{20}$ —50.7° (dioxane), ultra-violet maximum at 268 mu (log E 4.26).

Analysis.—Calculated for $C_{28}H_{36}OS$: C, 79.96; H, 8.62; S, 7.62. Found: C, 79.89; H, 8.74; S, 7.50.

Refluxing of 0.2 g. of the thioenol ether for one hour with 0.5% ethanolic hydrochloric acid led to 0.11 g. (73%) of progesterone, melting point 127–129° C., undepressed on admixture with the authentic hormone.

Example VIII $\Delta^{3,5}$-pregnadien-20-one.—One and one-half grams of the thionel ether of Example VII was desulfurized by refluxing with 200 cc. of acetone and 15 g. of W-2 Raney nickel for four hours; yield, 0.7 g. (69%), melting point 139–142° C. (after recrystallization from acetone-methanol), $(\alpha)_D^{20}$ —52.4°, ultra-violet maxima at 228 mu (log E 4.27) and 234 mu (log E 4.30).

Analysis.—Calculated for $C_{21}H_{30}O$: C, 84.50; H, 10.13. Found: C, 84.35; H, 9.87.

The semicarbazone, prepared by the sodium acetate method, was recrystallized from methanol-chloroform and showed melting point 248–250° C., $(\alpha)_D^{20}$ —31.1°, ultra-violet maximum at 232 mu (log E 4.33).

Analysis.—Calculated for $C_{22}H_{33}ON_3$: C, 74.32; H, 9.35. Found: C, 74.18; H, 9.24.

The oxime exhibited melting point 148–149° C., $(\alpha)_D^{20}$ —25.6° after recrystallization from methanol.

Analysis.—Calculated for $C_{21}H_{31}ON$: C, 80.46; H, 9.96. Found: C, 80.78; H, 10.19.

Allopregnan-20-one.—The hydrogenation of the diene (palladium charcoal in ethyl acetate) proceeded in 85% yield to yield allopregnan-20-one with melting point 136–137° C., $(\alpha)_D^{20}$ +100°, undepressed on admixture with a sample prepared from 22-isoallospirostan.

Example IX

Lithium aluminum hydride reduction of progesterone 3-benzylthioenol ether.—A solution of 3.0 g. of the enol ether in 300 cc. of ether was added over a period of ten minutes to a mixture of 0.3 g. of lithium aluminum hydride in 100 cc. of ether and then refluxed for fifteen minutes. Decomposition with water (no acid added) followed by extraction with ether, washing and evaporation gave 1.82 g. (60%) of $\Delta^4$-pregnen-20β-ol-3-one 3-benzylthioenol ether from methanol with melting point 138–140° C., $(\alpha)_D^{20}$ —128.4° (dioxane), ultra-violet maximum at 268 mu (log E 4.41).

Analysis.—Calculated for $C_{28}H_{38}OS$: C, 79.57; H, 9.06; S, 7.57. Found: C, 79.46; H, 9.13; S, 7.71.

Example X $\Delta^4$-pregnen-20β-ol-3-one.—The lithium aluminum hydride reduction product (1.0 g.) of Example IX was hydrolyzed by refluxing for one-half hour with 90 cc. of methanol, 10 cc. of water and 0.5 cc. of hydrochloric acid. Dilution with water, followed by extraction with ether, evaporation and recrystallization from dilute methanol gave 0.4 g. (60%) of the unsaturated ketone with melting point 169–171° C., $(\alpha)_D^{20}$ +83°, ultra-violet maximum at 242 mu (log E 4.31).

Example XI

17α-hydroxyprogesterone 3-benzylthioenol ether.—17α-hydroxyprogesterone was converted in 60% yield into its thioenol ether by the pyridine hydrochloride method of Example I. The analytical sample crystallized as small needles from acetone-methanol with melting point 182–183° C., $(\alpha)_D^{20}$ —101.7°, ultra-violet maximum at 268 mu (log E 4.38).

Analysis.—Calculated for $C_{28}H_{36}O_2S$: C, 77.02; H, 8.31; S, 7.33. Found: C, 77.17; H, 8.31; S, 7.60.

Acid hydrolysis of 100 mg. of the thioenol ether afforded 40 mg. of pure 17α-hydroxyprogesterone, melting point 217–219° C.

Example XII

Lithium aluminum hydride reduction of 17α-hydroxyprogesterone 3-benzylthioenol ether.—The reduction of 1.0 g. of enol ether of Example XI in 300 cc. of ether was carried out with 0.2 g. of lithium aluminum hydride exactly as described for the progesterone analog in Example IX. Recrystallization from methanol-acetone gave colorless crystals (62% yield) of $\Delta^4$-pregnen-17α,20β-diol-3-one 3-benzylthioenol ether with melting point 194–196° C., $(\alpha)_D^{20}$ —135.2° (dioxane), ultra-violet maximum at 268 mu (log E 4.40).

Analysis.—Calculated for $C_{28}H_{38}O_2S$: C, 76.67; H, 8.73; S, 7.29. Found: C, 76.70; H, 8.91; S, 7.49.

$\Delta^4$-pregnene-17α,20β-diol-3-one.—Acid hydrolysis of the enol ether in the usual manner led in 60% yield to $\Delta^4$-pregnene-17α,20β-diol-3-one, which after recrystallization from acetone-hexane showed melting point 201–204° C. (when inserted at 190° C.), $(\alpha)_D^{20}$ +68.2°, ultraviolet maximum at 240 mu (log E 4.29).

Analysis.—Calculated for $C_{21}H_{32}O_3$: C, 75.86; H, 9.70. Found: C, 75.49; H, 9.53.

Example XIII

Desoxycorticosterone acetate 3-benzylthioenol ether.—The pyridine hydrochloride of Example I method applied to 3.0 g. of desoxycorticosterone acetate and 2 g. of benzyl mercaptan (two and one-half hours refluxing) produced 2.3 g. (60%) of needles with melting point 156–158° C. The analytical sample was obtained from methanol-acetone with melting point 162–164° C., $(\alpha)_D^{20}$ —23.7° (dioxane), ultra-violet maximum at 268 mu (log E 4.30).

Analysis.—Calculated for $C_{30}H_{38}O_3S$: C, 75.28; H, 8.00; S, 6.68. Found: C, 75.39; H, 8.29; S, 6.77.

Example XIV $\Delta^{3,5}$-*pregnadien-21-ol-20-one 21-acetate.*—(a) *By dehydration of $\Delta^5$-pregnene-3$\beta$,21-diol-20-one 21-acetate.*—A solution of 2.0 g. of $\Delta^5$-pregnene-3$\beta$,21-diol-20-one 21-acetate was refluxed with 4.0 g. of phosphorus pentoxide and 125 cc. of benzene for three hours. The product was isolated by dilution with ether, washing with water, evaporation and chromatography of the oily residue. Recrystallization from acetone afforded 0.6 g. (32%) of colorless needles with melting point 153–155° C., $(\alpha)_D^{20}$ +46.5°, ultra-violet maximum at 232 mu (log E 4.30).

*Analysis.*—Calculated for $C_{23}H_{32}O_3$: C, 77.48; H, 9.04. Found: C, 77.09; H, 8.93.

(b) *By desulfurization of desoxycorticosterone acetate 3-benzylthioenol ether.*—Regardless of the reaction conditions, apparently some reduction of the diene system invariably occurred and the diene could not be isolated uncontaminated. The best results were obtained on refluxing an acetone solution of 0.5 g. of the enol ether with 4 g. of W-2 Raney nickel for two hours; yield, 0.3 g., (78%) melting point 166–168° C., $(\alpha)_D^{20}$ +70.6°, ultra-violet maxima at 228 mu (log E 4.01) and 234 mu (log E 4.03).

*Analysis.*—Found: C, 77.11; H, 9.22.

*Allopregnan-21-ol-20-one 21-acetate.*—Hydrogenation of the above diene (procedure b) gave 83% of allopregnan-21-ol-20-one 21-acetate with melting point 202–203° C., $(\alpha)_D^{20}$ +101.8°. The tetranitromethane test was negative and the product gave no depression in melting point when mixed with an authentic specimen prepared from allopregnan-20-one.

*Analysis.*—Calculated for $C_{23}H_{36}O_3$: C, 76.62; H, 10.06. Found: C, 76.79; H, 10.29.

Example XV $\Delta^{4,16}$-*pregnadiene-3,20-dione 3-benzylthioenol ether.*—Three grams of 16-dehydroprogesterone was refluxed for four hours with 2 g. of benzyl mercaptan, 0.2 g. of pyridine hydrochloride, 10 cc. of absolute ethanol and 150 cc. of benzene. The usual, previously described work-up led to 1.7 g. (43%) of thioenol ether with melting point 171–173° C., $(\alpha)_D^{20}$ −99.2° (dioxane), ultra-violet maxima at 242 mu (log E 4.27) (due to $\Delta^{16}$-20-keto grouping) and 268 mu (log E 4.21).

*Analysis.*—Calculated for $C_{28}H_{34}OS$: C, 80.33; H, 8.18; S, 7.65. Found: C, 80.58; H, 8.35; S, 7.72.

Example XVI $\Delta^{3,5,16}$-*pregnatrien-20-one.*—The desulfurization of the enol ether of Example XV (0.8 g.) was accomplished by refluxing in acetone with 8.0 g. of W-2 Raney nickel for three hours. The triene (0.4 g., 70%) was recrystallized from methanol-acetone as white needles with melting point 149–150° C., $(\alpha)_D^{20}$ −114.9°, ultra-violet maxima at 234 mu (log E 4.48) and 318 mu (log E 1.75).

*Analysis.*—Calculated for $C_{21}H_{28}O$: C, 85.08; H, 9.51. Found: C, 85.31; H, 9.61.

The oxime, obtained by the pyridine method, was recrystallized from methanol-chloroform, melting point 172–174° C., $(\alpha)_D^{20}$ −121.7°.

*Analysis.*—Calculated for $C_{21}H_{29}ON$: C, 80.98; H, 9.38. Found: C, 81.14; H, 9.41.

Hydrogenation of the triene proceeded rapidly in ethyl acetate solution with palladium-on-charcoal catalyst with consumption of three mols of hydrogen and led in 78% yield to allopregnan-20-one with melting point 134–135° C., $(\alpha)_D^{20}$ +100°.

Example XVII

*16-thiobenzylprogesterone 3-benzylthioenol ether.*—A solution of 8.0 g. of 16-dehydroprogesterone in 250 cc. of benzene was refluxed for four hours with 5.5 g. of benzyl mercaptan and 0.3 g. of p-toluenesulfonic acid. The usual work-up followed by recrystallization afforded 7.1 g. (51%) of faintly yellowish crystals with melting point 126–128° C., $(\alpha)_D^{20}$ −92.8° (dioxane), ultra-violet maximum at 268 mu (log E 4.19). The maximum at 242 mu was absent as compared to the product of Example XI.

*Analysis.*—Calculated for $C_{35}H_{42}OS_2$. H, 7.80; S, 11.81. Found: C, 77.03; H, 7.88; S, 12.08.

The semicarbazone (pyridine method) was obtained as a white, microcrystalline powder after recrystallization from methanol-chloroform; melting point 147–149° C., ultra-violet maximum at 268 mu (log E 4.27).

*Analysis.*—Calculated for $C_{36}H_{45}ON_3S_2$: C, 72.06; H, 7.56; N, 7.00; S, 10.69. Found: C, 71.98; H, 7.66; N, 7.16; S, 10.44.

Raney nickel desulfurization as previously set forth of the 16-thiobenzyl 3-benzylthioenol ether afforded 73% of $\Delta^{3,5}$-pregnadien-20-one with melting point 139–141° C., $(\alpha)_D^{20}$ −53.8°.

Example XVIII

*16-thiobenzylprogesterone.*—(a) *By addition of benzylmercaptan to $\Delta^{4,16}$-pregnadiene-3,20-dione.*—A solution of 3.0 g. of $\Delta^{4,6}$-pregnadiene-3,20-dione, 3.0 cc. of piperidine and 2.0 g. of benzyl mercaptan in 150 cc. of benzene was concentrated slightly by distillation to ensure complete dryness and then refluxed for three hours. After the usual work-up, 16-thiobenzylprogesterone (3.2 g., 76%) crystallized from hexane-acetone with melting point 143–145° C., $(\alpha)_D^{20}$ +61.5° (dioxane), ultra-violet maximum at 240 mu (log E 4.29).

*Analysis.*—Calculated for $C_{28}H_{36}O_2S$: C, 77.01; H, 8.31; S, 7.34. Found: C, 76.91; H, 8.44; S, 7.40.

The semicarbazone (sodium acetate method) exhibited melting point 202–204° C., ultra-violet maximum at 268 mu (log E 4.68).

*Analysis.*—Calculated for $C_{29}H_{39}O_2N_3S$: C, 70.56; H, 7.96; N, 8.50; S, 6.48. Found: C, 70.42; H, 7.97; N, 8.80; S, 6.35.

(b) *By acid hydrolysis of $\Delta^{4,16}$-pregnadiene-3,20-dione 3-benzylthioenol ether.*—One-half gram of the benzylthioenol ether product of Example XV was refluxed with 100 cc. of methanol and 0.5 cc. of concentrated hydrochloric acid for three hours. After processing as usual, 0.4 g. of 16-thiobenzylprogesterone was isolated with melting point 142–145° C., undepressed on admixture with a specimen prepared according to (a); the rotation and spectrum also were identical. In order to prove that the course of this reaction involved initial cleavage to 16-dehydroprogesterone followed by addition of the liberated benzylmercaptan to the $\Delta^{16}$-double bond, 1.0 g. of 16-dehydroprogesterone was refluxed for three hours with 0.6 cc. of benzyl mercaptan, 1 cc. of concentrated hydrochloric acid and 150 cc. of methanol. The 16-thiobenzyl progesterone (1.05 g.) thus isolated (melting point 142–144° C.) proved to be identical in all respects (rotation, spectrum) with the material synthesized according to (a).

(c) *By acid hydrolysis of 16-thiobenzylprogesterone 3-benzylthioenol ether.*—Employing the conditions outlined in (b) above, the thioenol ether product of Example XVII was converted to 16-thiobenzylprogesterone in nearly 90% yield.

Example XIX $\Delta^5$-*16-thiobenzylpregnen-3$\beta$-ol-20-one 3-acetate.*—A solution of 2.0 g. of $\Delta^{5,16}$-pregnadien-3$\beta$-ol-20-one 3-acetate in 70 cc. of benzene was allowed to stand at room temperature for four days with 3.0 g. of benzyl mercaptan and 4.0 cc. of piperidine. After washing with dilute hydrochloric acid, carbonate solution and water, evaporation and recrystallization from hexane, 2.05 g. (74%) of colorless crystals was obtained with melting point 124–125° C., $(\alpha)_D^{20}$ −40.2° (dioxane), no ultra-violet maximum at 240 mu.

*Analysis.*—Calculated for $C_{30}H_{40}O_3S$: C, 74.96; H, 8.38; S, 6.65. Found: C, 74.83; H, 8.41; S, 6.89.

A polymorphic form of $\Delta^5$-16-thiobenzylpregnen-3$\beta$-ol-20-one 3-acetate, melting point 78–80° C., $(\alpha)_D^{20}$ −39.8° (dioxane) was isolated in 71% yield when the reaction was carried out by the pyridine hydrochloride method of Example I (five hours refluxing). Hydrogenolysis and peroxide oxidation gave the same products as the 125° form.

Desulfurization of either product (melting point 80° C. or 125° C.) in the customary manner led in 90% yield to $\Delta^5$-pregnen-3$\beta$-ol-20-one 3-acetate, melting point 147–148° C., $(\alpha)_D^{20}$ +16°, and on saponification to the free pregnenolone, melting point 188–190° C., $(\alpha)_D^{20}$ +25°; no depression in melting point was observed on admixture with authentic specimens.

It will be obvious to those skilled in the art that various changes may be made without departing from the spirit of the invention and therefore the invention is not limited to what is described in the specification but only as indicated in the appended claims.

We claim:
1. A process for the production of 16-thiobenzylprogesterone 3-benzylthioenol ether which comprises reacting 16-dehydroprogesterone with an excess of benzylmercaptan in the presence of a strong acid catalyst.
2. A process for the production of 16-thiobenzylprogesterone 3-benzylthioenol ether which comprises reacting 16-dehydroprogesterone with an excess of benzylmercaptan in the presence of p-toluenesulfonic acid.
3. A process for the production of 16-thiobenzylprogesterone which comprises reacting $\Delta^{4,16}$-pregnadiene-3,20-dione with benzylmercaptan in the presence of a basic catalyst.
4. A process for the production of 16-thiobenzylprogesterone which comprises reacting $\Delta^{4,16}$-pregnadiene-3,20-dione with benzylmercaptan in the presence of piperidine.
5. A process for the production of 16-thiobenzyl derivatives of the pregnen series which comprises treating a $\Delta^{16}$-pregnen compound with benzylmercaptan in the presence of a catalyst.
6. A process for the production of 16-thiobenzyl derivatives of the pregnen series which comprises treating a $\Delta^{16}$-pregnen compound with benzylmercaptan in the presence of piperidine.
7. A process for the production of $\Delta^5$-16-thiobenzylpregnen-3$\beta$-ol-20-one 3-acetate which comprises treating $\Delta^{5,16}$-pregnadiene-3$\beta$-ol-20-one 3-acetate with benzylmercaptan in the presence of piperidine.
8. A process for the production of $\Delta^5$-16-thiobenzylpregnen-3$\beta$-ol-20-one 3-acetate which comprises treating $\Delta^{5,16}$-pregnadiene-3$\beta$-ol-20-one 3-acetate with benzylmercaptan in the presence of pyridine hydrochloride.
9. A new compound consisting of 16-thiobenzylprogesterone 3-benzylthioenol ether having a melting point of 126–128° C.
10. A new compound selected from the group consisting of $\Delta^5$-16-thiobenzylpregnen-3$\beta$-ol-20-one 3-acetate having a melting point of 124–125° C. and its polymorphic form having a melting point of 78–80° C.
11. A new compound consisting of 16-thiobenzylprogesterone having a melting point of 143–145° C.
12. A new compound consisting of a 16-thiobenzyl ether of the pregnane series.
13. A process for the production of 16-thio ethers of the pregnene series which comprises treating a $\Delta^{16}$-pregnene compound with a mercaptan in the presence of piperidine.

No references cited.